(No Model.)  2 Sheets—Sheet 1.

J. G. WILSON.
VENETIAN BLIND.

No. 414,743.  Patented Nov. 12, 1889.

Witnesses
S. S. Williamson
J. J. Devitt

Inventor
James G. Wilson
By
J. M. Smith Jr.
Atty.

(No Model.)  2 Sheets—Sheet 2.

J. G. WILSON.
VENETIAN BLIND.

No. 414,743.  Patented Nov. 12, 1889.

Witnesses
S. Williamson.
J. J. Devitt

Inventor
James G. Wilson
By
J. W. Smith
Atty.

UNITED STATES PATENT OFFICE.

JAMES G. WILSON, OF NEW YORK, N. Y.

VENETIAN BLIND.

SPECIFICATION forming part of Letters Patent No. 414,743, dated November 12, 1889.

Application filed December 26, 1888. Serial No. 294,667. (No model.)

*To all whom it may concern:*

Be it known that I, JAMES G. WILSON, a citizen of the United States, residing at New York city, in the county of New York and State of New York, have invented certain new and useful Improvements in Venetian Blinds; and I do hereby declare the following to be a full, clear, and exact description of the invention, such as will enable others skilled in the art to which it appertains to make and use the same.

My invention relates to certain new and useful improvements in the construction of hangers for Venetian blinds, and has for its object to improve upon the construction shown and described in my patent, No. 398,484, dated February 26, 1889.

With these ends in view my present invention consists in combining with the cross-pieces which support the slats intermediate links by which said cross-pieces are pivotally connected to the opposite parallel series of hinged sections.

Figure 1:
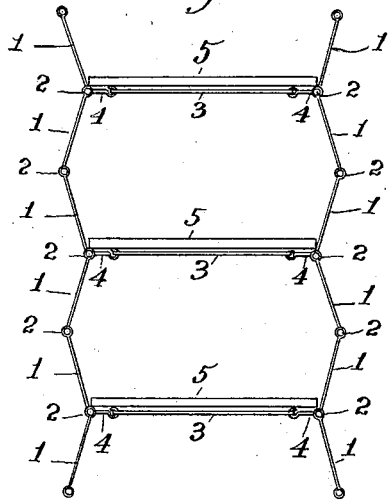
Figure 2:
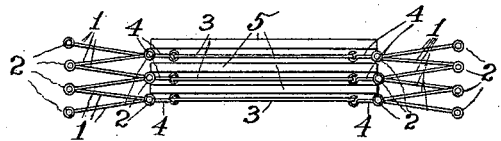
Figure 3:
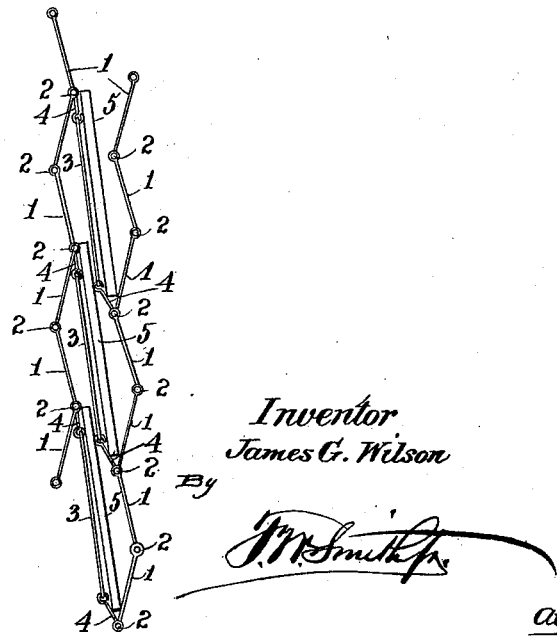
Figure 4:
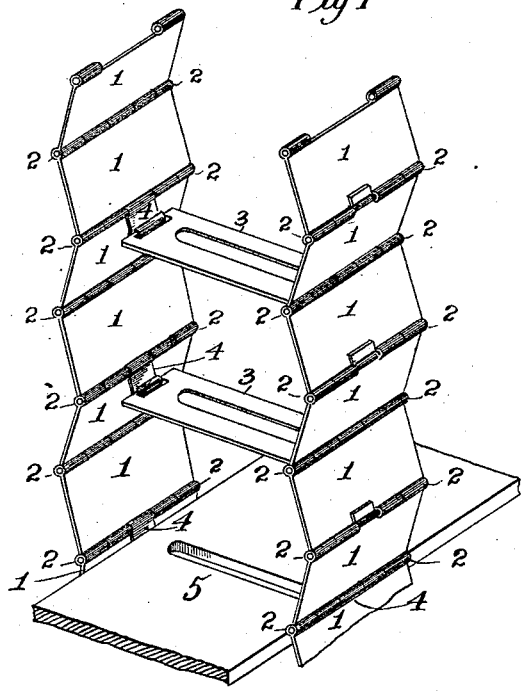

In the accompanying drawings, Figure 1 is an end view showing the preferred adaptation of my improvement; Fig. 2, an end view showing the position of the slats and links when the blinds are raised; Fig. 3, an end view showing the blinds closed; Fig. 4, a perspective illustrating a short section of a hanger the slat-supports whereof are constructed in accordance with my invention, the bottom support having thereon a narrow slat; and Figs. 5 and 6, views similar to Figs. 2 and 3, but showing how narrow slats may be used in connection with my improvement.

Similar letters denote like parts in the several figures.

I have in the above-described figures shown only short sections of the hangers, since they sufficiently portray my invention.

I will not enter into any description of the construction or operation of the hanger-sections, as they form no part of my present invention, and, moreover, are the same in every respect as the sections shown and described in my aforesaid patent. In said patent the cross-pieces were stepped and the leaves of the hanger-sections were cut away to enable said pieces and the slats supported thereby to be swung into a vertical plane to closed position. I have been very averse to cutting away said sections, for the reasons that they were thereby weakened and that the appearance of the hangers was unsightly, especially when the slats were closed and the cross-pieces extended through the sections of the hangers.

My present invention obviates the necessity of cutting away the hangers, does not mar the external appearance of the latter, and will be best understood from the following description.

The hangers are composed of sheet-metal sections 1, hinged together at 2, and in all respects constructed and arranged to operate as set forth in my aforesaid patent.

3 are the cross-pieces which extend between the hanger-sections, and 4 are independent links, the upper ends whereof are pivoted around the pintles of every alternate hinge of said sections, the lower ends being pivoted to the extremities of the cross-pieces. Thus it will be seen that said cross-pieces are pivotally suspended from the ends of links which are themselves in turn pivoted to the opposite sections of the hanger.

I prefer to make the combined lengths of the cross-pieces and links about equal to the width of the slats 5, as shown at Fig. 1, so that there can be no lateral play of said slats.

When the sections of the hanger are operated to close the slats, the cross-pieces will be swung to the position shown at Fig. 3, thereby bringing the slats to nearly a vertical position without any cramping of either the sections or the cross-pieces; also, when the slats are raised, the links 4 will retain their horizontal position, thereby bringing the slats close together, so as to occupy the least possible space, as shown in Fig. 2.

Figure 5:
Figure 6:
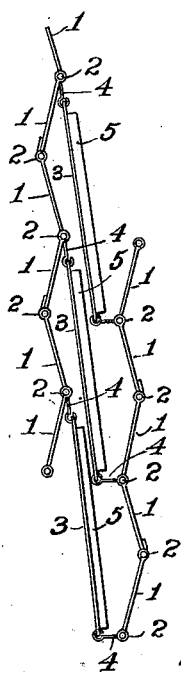

In case narrow slats are used they will rest only on the cross-pieces 3 and not on the links 4, as will be seen at Fig. 4, and when the blinds are raised the cross-pieces and links will assume the position shown at Fig. 5.

Of course it is not necessary that the cross-pieces should be made in a single piece, since they may be composed of two or more hinged sections, the gist of my invention resting in the broad idea of a support for the slats consisting of hinged cross-pieces.

I claim—

1. In combination, the two vertical hinged metallic sections, the horizontal slat-supports, and the short links pivoted at their inner ends to the ends of said slat-supports and at their outer ends to alternate pivotal points of the hinged sections, as set forth.

2. In combination, the two vertical hinged metallic sections, the horizontal slat-supports, the short links pivoted at their inner ends to the ends of said slat-supports and at their outer ends to alternate pivotal points of the hinged sections, and the slats lying loosely upon the horizontal supports, as set forth.

In testimony whereof I affix my signature in presence of two witnesses.

JAMES G. WILSON.

Witnesses:
   AUGUSTUS ADRIAN,
   WM. A. ROEDEL.